United States Patent
Das et al.

(10) Patent No.: US 10,848,302 B2
(45) Date of Patent: Nov. 24, 2020

(54) NETWORK SECURITY FRAMEWORK FOR WIRELESS AIRCRAFT COMMUNICATION

(71) Applicant: Simmonds Precision Products, Inc., Vergennes, VT (US)

(72) Inventors: Subhra Kanti Das, Bangalore (IN); Adishesha Chinknyakanhalli Sivaramasastry, Karnataka (IN); Michael A. Lynch, Shelburne, VT (US); Kiran Thupakula, Bangalore (IN)

(73) Assignee: SIMMONDS PRECISION PRODUCTS, INC., Vergennes, VT (US)

(*) Notice: Subject to any disclaimer, the term of this patent is extended or adjusted under 35 U.S.C. 154(b) by 191 days.

(21) Appl. No.: 16/002,146

(22) Filed: Jun. 7, 2018

(65) Prior Publication Data

US 2019/0319786 A1    Oct. 17, 2019

(30) Foreign Application Priority Data

Apr. 12, 2018    (IN) .............................. 201811014030

(51) Int. Cl.
| | |
|---|---|
| *H04L 29/06* | (2006.01) |
| *H04L 9/08* | (2006.01) |
| *H04W 4/40* | (2018.01) |
| *H04W 12/04* | (2009.01) |

(52) U.S. Cl.
CPC .......... *H04L 9/0819* (2013.01); *H04L 9/0869* (2013.01); *H04L 9/0891* (2013.01); *H04W 4/40* (2018.02); *H04W 12/04* (2013.01)

(58) Field of Classification Search
CPC ... H04L 9/0819; H04L 9/0869; H04L 9/0891; H04W 4/40

USPC .......................................................... 713/171
See application file for complete search history.

(56) References Cited

U.S. PATENT DOCUMENTS

| | | | |
|---|---|---|---|
| 8,219,799 B1 | 7/2012 | Lucchesi et al. | |
| 8,880,896 B1* | 11/2014 | Elliott ................... | H04L 9/0841 |
| | | | 713/185 |
| 9,571,378 B2 | 2/2017 | Dame | |
| 9,591,009 B2 | 3/2017 | Craig et al. | |
| 2013/0290703 A1* | 10/2013 | Resch ................... | G06F 3/0619 |
| | | | 713/155 |
| 2014/0314231 A1 | 10/2014 | Gilbert | |
| 2015/0104017 A1 | 4/2015 | Halford et al. | |
| (Continued) | | | |

FOREIGN PATENT DOCUMENTS

WO    2017006115 A1    1/2017

OTHER PUBLICATIONS

European Search Report for Application No. 19169082.5-1218, dated Jan. 7, 2019, 9 pages.

*Primary Examiner* — Evans Desrosiers
(74) *Attorney, Agent, or Firm* — Cantor Colburn LLP

(57) ABSTRACT

Embodiments of the invention include techniques for implementing a network security framework for wireless aircraft communication, where the techniques include receiving a key index sequence over a first communication link, and transmitting a subset of the key index to one or more nodes. The techniques also include generating a random encryption key based at least in part on the subset of the key index sequence, encrypting data using the random encryption key, and transmitting the encrypted data over a second communication link.

19 Claims, 7 Drawing Sheets

(56) References Cited

U.S. PATENT DOCUMENTS

2017/0099143 A1  4/2017 Sanders et al.
2019/0349426 A1* 11/2019 Smith ................... H04L 67/104

* cited by examiner

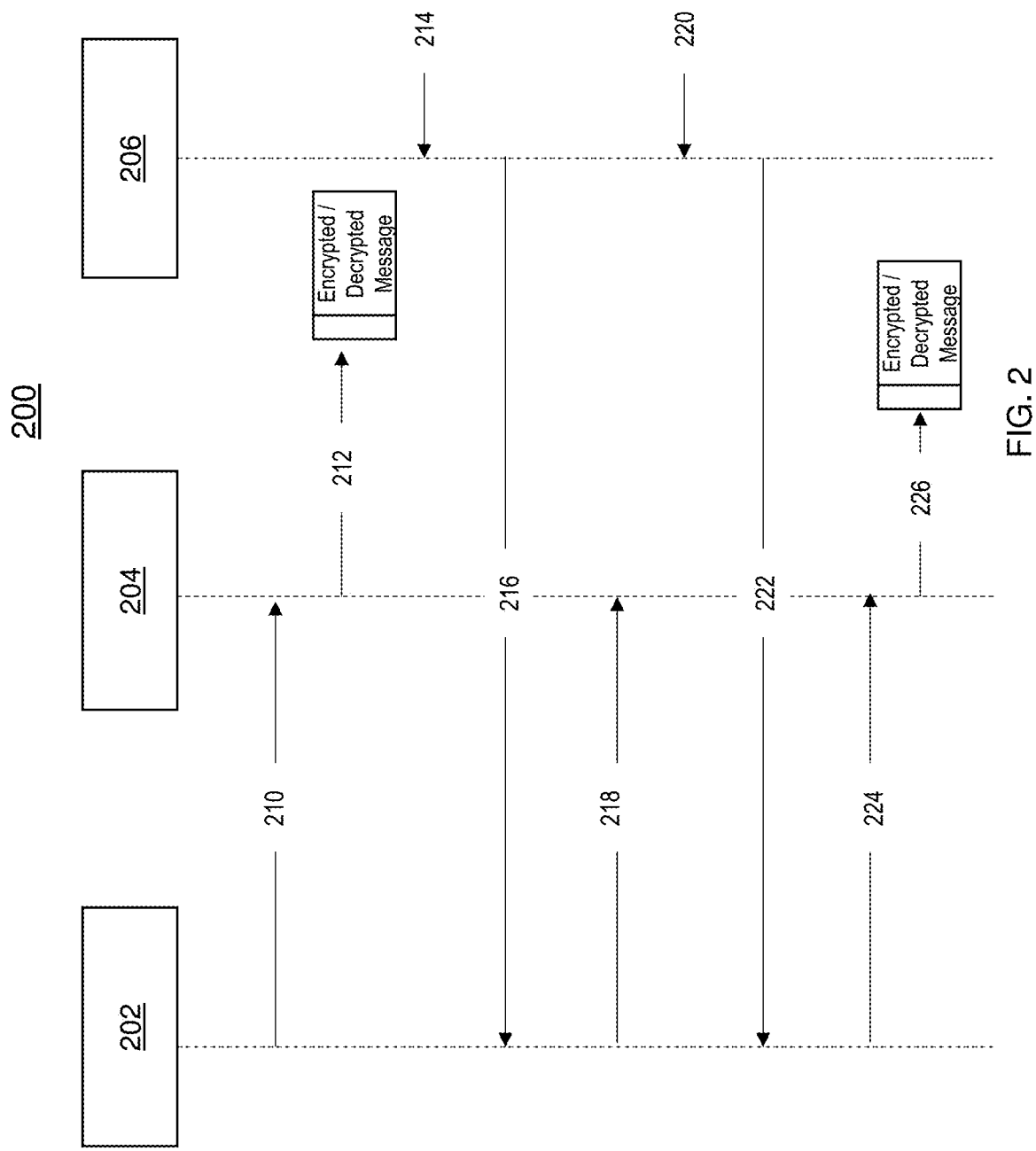

| Algorithm Steps | Explanation |
| --- | --- |
| Step -1: FIB_first → 1<br>FIB_second → 1<br>Key_pre → 1 | Initialization of primary variables used in the algorithm |
| Step -2: FIB → FIB_first + FIB_second<br>FIB_first → FIB_second<br>FIB_second → FIB | FIB is the sum of the previous two Fibonacci numbers. FIB_first and FIB_second are variables which store the previous two FIB numbers for the present sampling instant |
| Step -3: FIB → FIB MOD 65536 | FIB is rounded off by the maximum number possible with 16 bit (65536) so that there is no overflow |
| Step -4: M = [FIB x 2147745875] MOD 65536 | M is an intermediate large number which determines the periodicity of the PRN sequence |
| Step -5: Key_algo → [Key_pre x 16807] | Key_algo is the current random key computed using the key generated in the previous sampling instant |
| Step -6: Key_pre → Key_algo | Key_pre preserves the current value of key to be used in Step -5 in the next sampling instant |

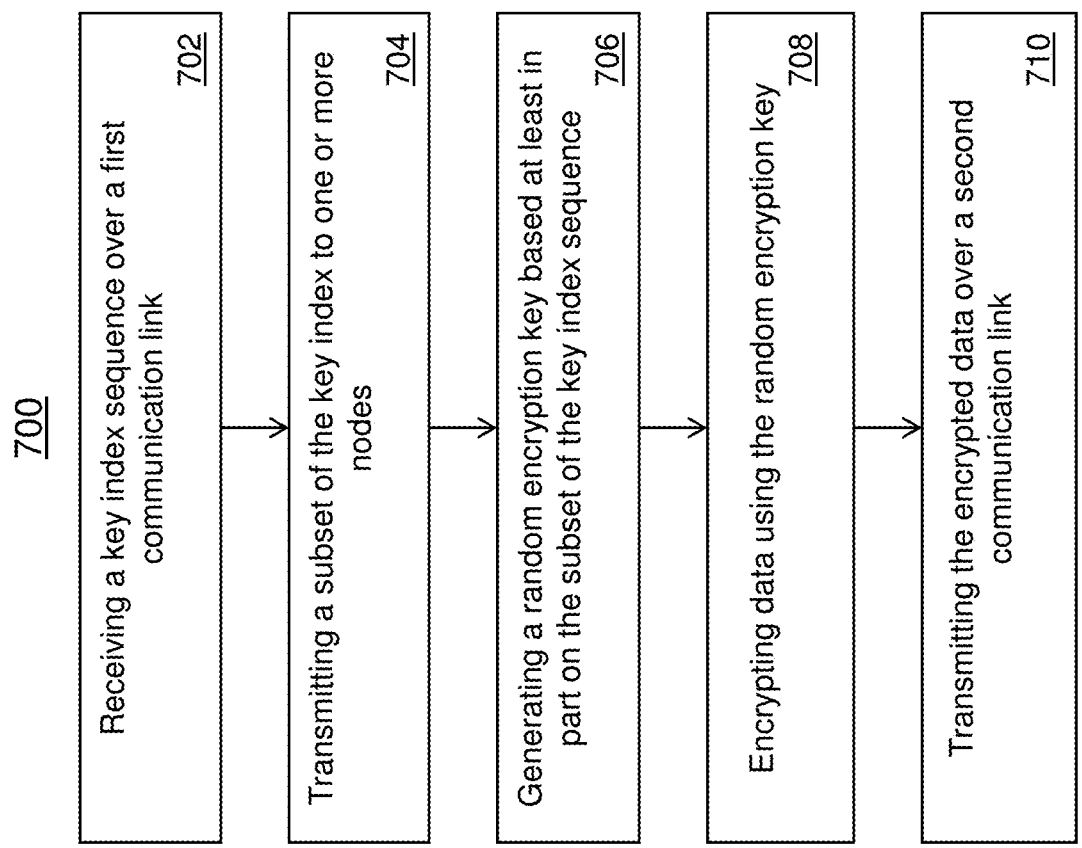

NETWORK SECURITY FRAMEWORK FOR WIRELESS AIRCRAFT COMMUNICATION

CROSS-REFERENCE TO RELATED APPLICATIONS

This application claims the benefit of Indian Application No. 201811014030 filed Apr. 12, 2018, which is incorporated herein by reference in its entirety.

BACKGROUND

The present invention generally relates to wireless communication, and more specifically, to a network security framework for wireless aircraft communication.

Wireless communication can simplify the network architecture by making networks more flexible in terms of configurability, scalability and maintainability. A secure wireless communication is key to accomplish the needs of aircraft application like prognostic health management, aircraft health management, integrated vehicle health monitoring and other safety-critical systems. The architecture must be able to sustain attacks due to its vulnerabilities to attack by malicious and unauthorized devices.

BRIEF DESCRIPTION

According to one embodiment, a method for implementing a network security framework for wireless aircraft communication is provided. The method includes receiving a key index sequence over a first communication link, and transmitting a subset of the key index to one or more nodes. The method also includes generating a random encryption key based at least in part on the subset of the key index sequence, encrypting data using the random encryption key, and transmitting the encrypted data over a second communication link.

In addition to one or more of the features described above, or as an alternative, further embodiments may include wherein the first communication link is a wired communication link.

In addition to one or more of the features described above, or as an alternative, further embodiments may include wherein the second communication link is a wireless communication link.

In addition to one or more of the features described above, or as an alternative, further embodiments may further include detecting an expiry of encryption keys and responsive to the detection, renewing the encryption keys for a particular wireless data controller.

In addition to one or more of the features described above, or as an alternative, further embodiments may further include detecting a tampering of sensor nodes, and responsive to the detection, transmitting new encryption key indices for each wireless data controller in a network.

In addition to one or more of the features described above, or as an alternative, further embodiments may further include updating the encryption keys and allocating the keys are based on a Fibonacci series.

In addition to one or more of the features described above, or as an alternative, further embodiments may further include storing a key index matrix.

According to another embodiment, a system for implementing network security framework for wireless aircraft communication is provided. The system includes a first node connected to one or more second nodes over a first communication link, where the first node transmits a key index sequence to the one or more second nodes. The system also includes one or more second nodes connected to one or more third node over a second communication link, where the one or more second nodes transmits a subset of the key index sequence to the one or more third nodes to generate random encryption keys based at least in part on the subset of the key index sequence.

In addition to one or more of the features described above, or as an alternative, further embodiments may include wherein the key index is transmitted sequentially to the one or more second nodes.

In addition to one or more of the features described above, or as an alternative, further embodiments may include wherein the first communication link is a wired connection.

In addition to one or more of the features described above, or as an alternative, further embodiments may include wherein the second communication link is a wireless connection.

In addition to one or more of the features described above, or as an alternative, further embodiments may include wherein the first node includes a key index matrix for storing the key index sequence.

In addition to one or more of the features described above, or as an alternative, further embodiments may include wherein the one or more second nodes and the one or more third nodes include encryption key generator modules for generating encryption keys from the key index sequence.

In addition to one or more of the features described above, or as an alternative, further embodiments may include wherein the first node is an aircraft interface device includes a key index renewal and revocation module to renew or revoke the key index sequence.

In addition to one or more of the features described above, or as an alternative, further embodiments may include wherein the first node is a network manager configured to aggregate received data and communicates with external systems.

In addition to one or more of the features described above, or as an alternative, further embodiments may include wherein the one or more second nodes are wireless data controllers.

In addition to one or more of the features described above, or as an alternative, further embodiments may include wherein the one or more third nodes are sensor nodes.

According to different embodiment, a device for implementing a network security framework for wireless aircraft communication is provided. The device includes a first interface configured to receive a first message from the aircraft interface device over a first communication link, wherein the first message includes a key index and a second interface configured to transmit a second message to one or more sensors, wherein the second message includes a subset of the key index. The device also includes an encryption key generator module configured to generate an encryption key based on the second message and encrypt a message using the encryption key. The device includes an interface to transmit encrypted messages over a second communication link.

In addition to one or more of the features described above, or as an alternative, further embodiments may include wherein the first interface is a wired interface and the second interface is a wireless interface.

In addition to one or more of the features described above, or as an alternative, further embodiments may include wherein the first interface is configured to receive updated key indices based on detecting an expiry of an encryption key or tampering of any sensor node.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 2 depicts a sequence diagram for a network security framework for wireless aircraft communication in accordance with one or more embodiments of the invention;

FIG. 3 depicts an algorithm for implementing a network security framework for wireless aircraft communication in accordance with one or more embodiments of the invention;

FIG. 7 depicts a high-level flowchart for implementing a network security framework for wireless aircraft communication in accordance with one or more embodiments of the invention.

DETAILED DESCRIPTION

Avionic communications in aircrafts use wired communication links which are based on ARINC and Ethernet protocols. To adapt the wired communication to wireless communication, applications such as Tablet Interface Module (TIM) and Electronic Flight Bag (EFB) are being connected through wireless communication. These devices communicate with external systems through various devices. The network security is accomplished through data encryption and authentication by password. However, challenges due to vulnerability of an attack by malicious wireless devices must be addressed.

The techniques described herein define a new wireless network architecture and develop a robust security framework. The wireless network architecture includes a layered wireless network having a network manager, multiple cluster coordinators and wireless sensor clusters. The security framework is developed for wireless aircraft communications using optimized message encryption techniques and encryption key management schemes.

Figure 1:
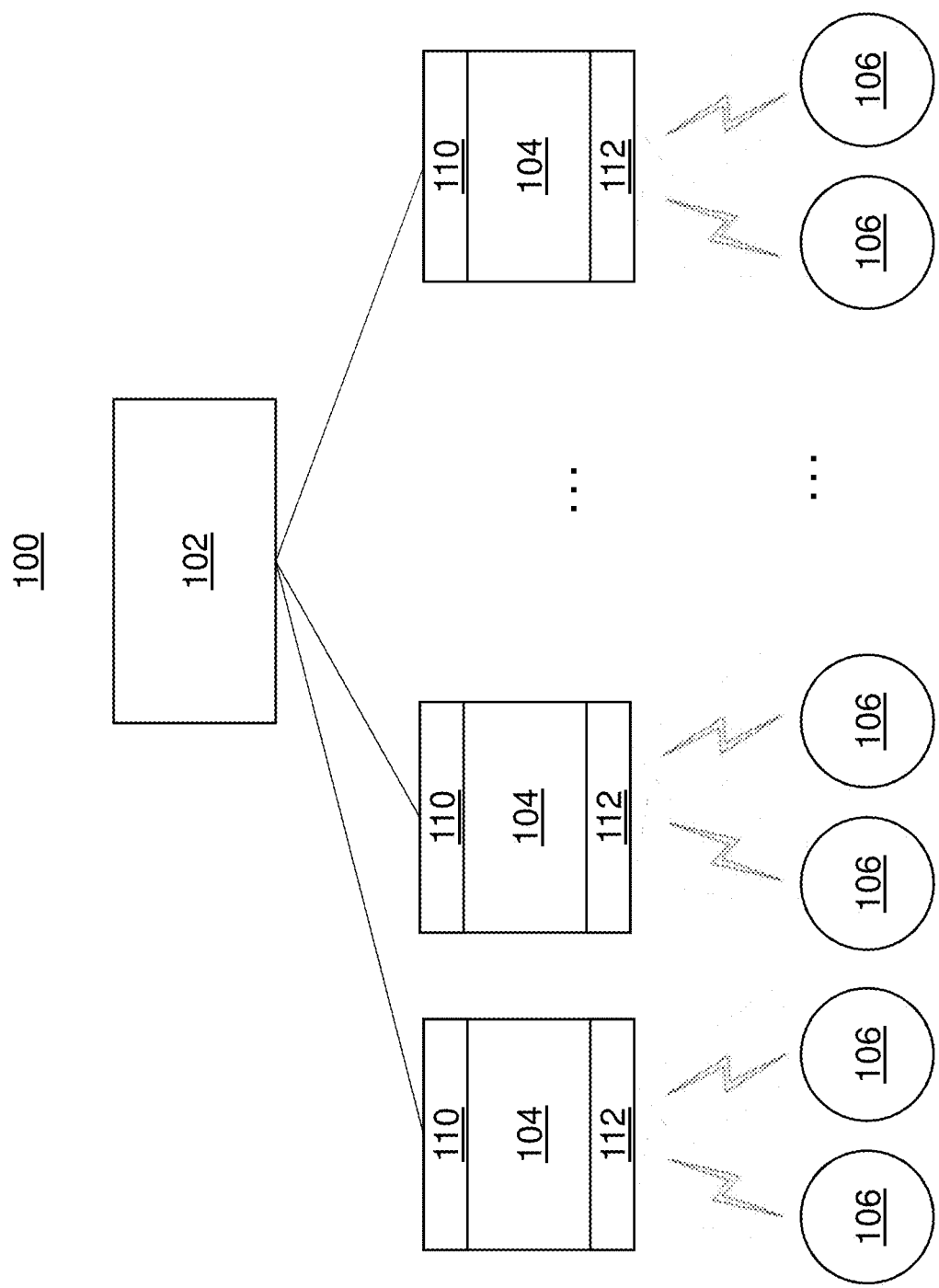
FIG. 1 depicts a wireless network architecture for implementing a network security framework for wireless aircraft communication in accordance with one or more embodiments of the invention.

Now referring to FIG. 1, a wireless sensor network (WSN) 100 in accordance with one or more embodiments of the invention is shown.

The WSN 100 as shown includes multiple layers. In one or more embodiments of the invention the first layer includes an Aircraft Interface Device (AID). The AID 102 is coupled to one or more wireless data controllers 104 of the second layer. In an embodiment, the communication link between the AID 102 and the wireless data controllers is a wired connection. As shown in FIG. 1, the wireless data controllers are coupled to one or more sensors 106 of a third layer.

The AID 102 functions as network manager that interfaces with the WSN 100 and with external users. The AID 102 is configured with one or more modules to implement the techniques described below with reference to FIG. 2. The AID 102 includes a key index distribution center module 202 for transmitting the key indices to the wireless data controllers 104. The AID 102 also includes a key index renewal module 206 for transmitting new key indices to the wireless data controllers 104. The AID 102 includes a key index revocation module 206 for detecting the revocation of a used key.

The wireless data controllers 104 function as cluster coordinators that acquire data from critical aircraft sensor systems such as but not limited to AHRS, air data probes, temperature sensors, pressure sensors, and the like. The wireless data controllers are configured with a first wired interface 110 and a second wireless interface 112. The wireless data controllers 104 include encryption key generator modules (not shown in FIG. 1) for encrypting messages transmitted between the wireless data controllers 104 and the sensors 106. The encryption keys are based on the received key index sequence from the AID 102. Because the keys are generated from the key index sequence the encryption key are not stored at the wireless data controller 104. Upon receiving the key indices each wireless data controller transmits its subset of indices to its sensor cluster. The encryption key generator module being executed in the wireless data controllers 104 and sensor nodes 106 use the key indices as seed numbers and generate the encryption keys for transmitting messages over the wireless channel. The keys are dynamically generated from seed indices from the key index sequence for each data transmission. The transmission and reception uses the symmetric cryptography technique described below. It is to be understood that other configurations of the wireless data controllers can be used.

The sensors 106 generate sensor data and transmit the sensor data to the AID 102 through the wireless data controllers 104. The sensors 106 can include sensors such as but not limited to AHRS, IMU, proximity sensors, pressure sensors, air data probes, and the like. In addition, the sensors include encryption key generator modules for encrypting/decrypting messages transmitted between the sensors 106 and wireless data controllers 104 using the received key indices as seed numbers for generating the keys. The sensors do not store the encryption keys as they are generated for each data transmission. In one or more embodiments of the invention, the wireless data controllers 104 can aggregate/consolidate the received sensor data into a single WSN data packet. In one or more embodiments of the invention the sensor nodes 106 are arranged in clusters, where the sensor nodes 106 that are coupled to the same wireless data controller 104 define the cluster.

Now referring to FIG. 2, a diagram 200 for implementing a network security framework for wireless aircraft communication in accordance with one or more embodiments of the invention is shown.

In one or more embodiments of the invention, the key index distribution center 202 resides on the AID 102 of FIG. 1. The key index distribution center 202 is configured to distribute the initial sequence of encryption key indices to the wireless data controllers 104. The encryption key indices are distributed sequentially to each of the wireless data controllers 104 in the network. In addition, the key index distribution center 202 is configured to redistribute the renewed sequence of key indices.

An initial key index sequence is generated and stored in the memory of the AID 102. The key index matrix is created in memory, where the key index matrix contains the subset of indices assigned to every data controller and is indexed by communication address of a data controller. Using the key index matrix the AID 102 is able to manage the assignment of the key index sequences in the network.

Distribution of key index sequence is carried out using a group based transmission scheme. In this scheme, each wireless data controller 104 receives N unique key indices such that, N=T/m, where T is the total number of key indices and m is the number of wireless data controllers 104. Let K(i) be the set of indices for data controller labeled 'i'. Following the principle of group based distribution, K(i)∩K(i+1)={φ}. The encryption keys generated within a sensor cluster is unique from other clusters and common to all the sensors within the given cluster.

The encryption key generator 204 is located in both wireless data controllers 104 and the sensor nodes 106. The encryption key generator 204 is configured to compute the encryption keys from the key index sequence received from the distribution center 202 using the symmetric cryptography scheme. These devices are not pre-configured with master keys and the encryption keys are not stored within each of the devices.

In one or more embodiments of the invention, the encryption key generator 204 uses linear congruential techniques of computing pseudo-random numbers which is discussed below with reference to FIG. 3. The seed number used for the encryption technique is selected from the list of key indices received from the distribution center 202.

The key index renewal/revocation module 206 is configured to renew or revoke key index sequences created initially during the network setup/startup phase. The key index sequence is generated using the techniques referred to in FIG. 3.

In one or more embodiments of the invention, the renewal/revocation module 206 is configured to renew the original key index sequence, update the key index matrix with the renewed sequence, and subsequently redistribute the new key index sequence either locally to a particular wireless data controller address that identifies the wireless data controller 104 or broadcast to all the wireless data controllers 104 in the network. The multi-tier renewal scheme will be discussed with reference to FIG. 4 below.

Referring back to FIG. 2, step 210 provides the key index distribution center 202 distributes a key index sequence to an encryption key generator 204. The encryption key generator 204 is included in the wireless data controllers 104 and the sensor nodes 106.

At step 212, the encryption key generator 204 is configured to encrypt/decrypt the data into a message using keys based on the received key index sequence from the key index distribution center 202.

Step 214 provides receiving, at a key index renewal/revocation module 206, a notification of an expiry of a set of encryption keys. Responsive to the detection of the expiry of encryption keys, at step 216 the key index renewal/revocation module 206 transmits a message to renew key indices set for the affected cluster. In one or more embodiments of the invention, the key indices are only valid for a predetermined period of time. Step 218 provides the key index distribution center 202 distributes the renewed key index set to the encryption key generator of the wireless data controller 104 for the particular affected cluster.

Step 220 provides receiving, at a key index renewal/revocation module 206, a notification of node tampering. Node tampering can indicate that a node is suspected to have been attacked or compromised. Responsive to the detection of the node tampering, at step 222, the key index renewal/revocation module 206 transmits a message to renew the key indices set for all clusters in the network. Step 224 provides the key index distribution center 202 distributes the renewed key index set to the encryption key generator 204 wireless data controller 104 for all clusters of the network. Finally, step 226 provides encryption of the message with the renewed key sequence.

Now referring to FIG. 3, a table 300 implementing the encryption scheme for generating keys is shown. In one or more embodiments of the invention, the encryption key generator modules of the wireless data controllers 104 and sensor nodes 106 carry out the steps below to generate the encryption keys used for encryption.

Step 1 as shown in table 300 provides initializing the primary variables used in the algorithm for determining the encryption keys from the key index sequence. The primary variables include FIB_first, FIB_second, and Key_pre which are initialized to 1 in this example.

Step 2 provides the variable FIB is the sum of the previous two Fibonacci numbers, FIB_first and FIB_second, are variables which store the previous two Fibonacci numbers for the present sampling instant.

Step 3 provides the variable FIB is rounded off by the maximum number possible with 16-bit 965536) so that there is no overflow.

Step 4 provides the variable M is an intermediate large number which determines the periodicity of the PRN sequence.

Step 5 provides the variable Key_algo is the current random key computed using the key generated in the previous sampling instant Step 6 provides the variable Key_pre preserves the current value of the key to be used in step 5 in the next sampling instant.

Figure 4:
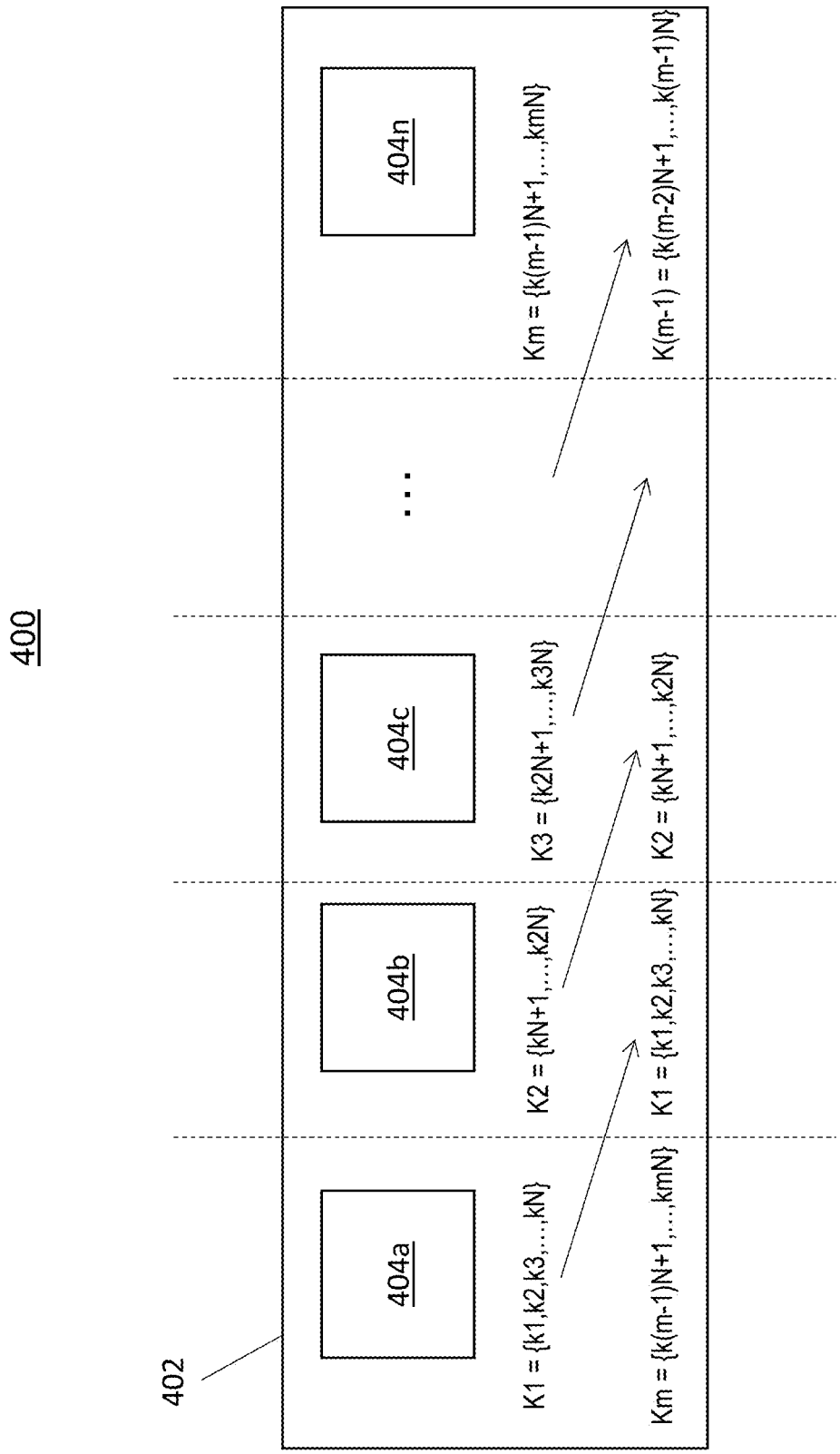
FIG. 4 depicts a renewal scheme for implementing a security framework for wireless aircraft communication in accordance with one or more embodiments of the invention.

Now referring to FIG. 4, a diagram 400 of a network 402 in accordance with one or more embodiments of the invention is shown.

The global network 402 as shown includes one or more wireless data controllers 404a, 404b, 404c . . . 404n, where the wireless data controllers 404 are similar to that shown in FIG. 1. As described herein, the wireless data controllers 404 function as cluster coordinators for managing sensors such as sensor nodes 106 and other devices that are coupled to each wireless data controller 404, respectively. In addition, the wireless data controllers 404 are configured to exchange data with an aircraft interface device 102. One or more embodiments of the invention allow for the key indices for each wireless data controller 404 to be updated independently of the other wireless data controllers 404 in the network 402. In other embodiments, each and every wireless data controller 404 of the network 402 can be updated simultaneously. This allows for the efficient use and distribution of keys in the WSN. Only those clusters that require updating will be updated.

As shown in FIG. 4, at the global level the subset of indices (K1, K2 . . . Km) for 'm' numbers of wireless data coordinators 104 are shifted by one place. Each wireless data controller 404 receives a subset from its left neighbor and its own subset is moved to its right neighbor during a global renewal of key indices.

At the local level where a single wireless data controller 404 is updated, the renewal for a single wireless data controller 104 bit-wise right shift operation is performed on each index number in the original subset K1. The right shifted subset (K>>1 bit) is subsequently XOR-ed with K1 and the new subset K1' is generated.

Figure 5:
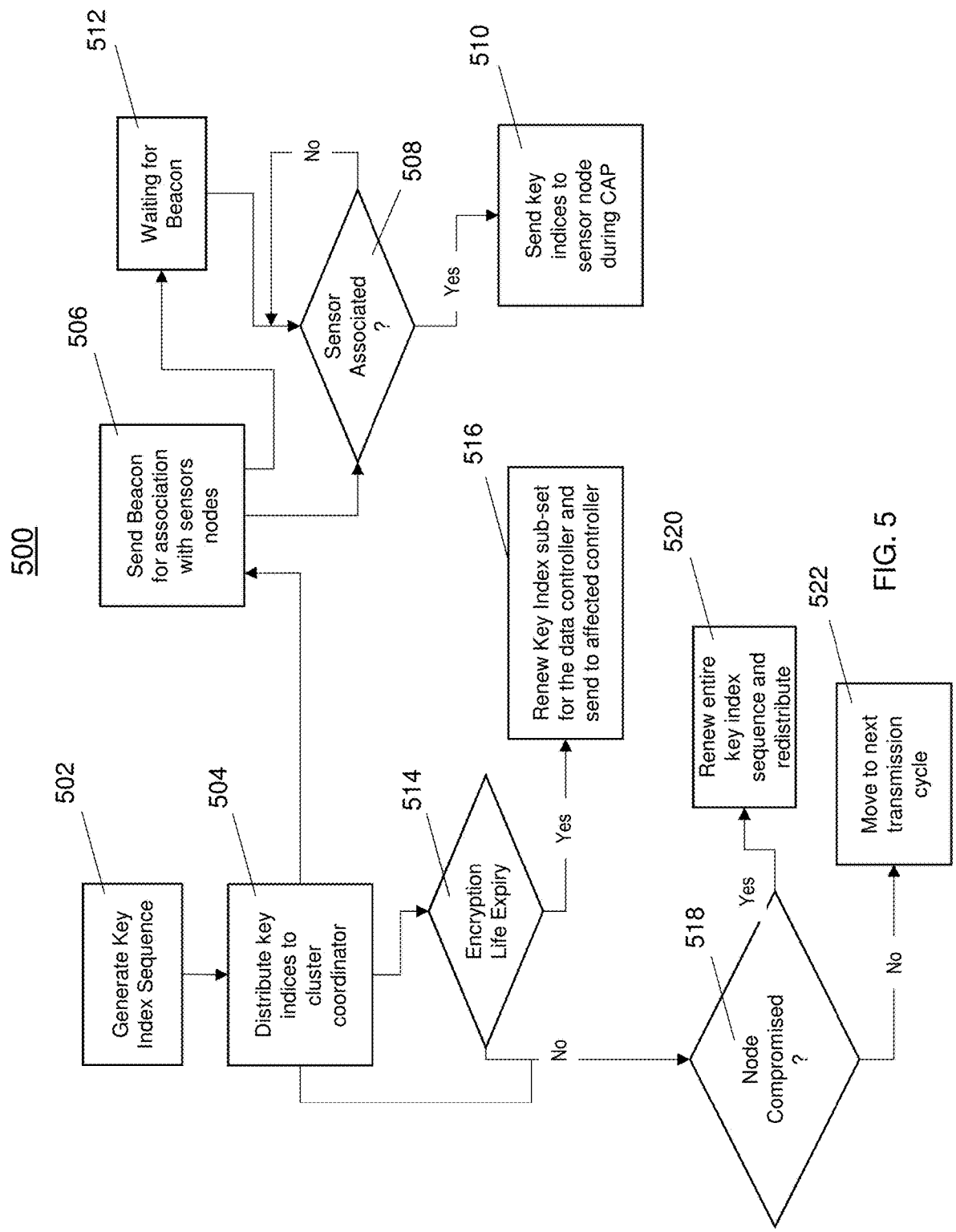
FIG. 5 depicts a detailed flowchart for implementing a network security framework for wireless aircraft communication in accordance with one or more embodiments of the invention.

The multi-tier renewal scheme allows for case dependent index renewal. The proposed method is suitable for a multi-rated sensor network having different data sampling rates. Given such a case, a fast cluster can quickly consume its set of allocated encryption keys and hence request for renewal, a fast cluster can quickly consume its set of allocated encryption keys and hence request for renewal. Local control avoids renewing the entire sequence and hence saves redistribution of new indices to all the coordinators. This reduces security management overhead and utilizes channel capacity in an optimal manner Global renewal occurs in the event a sensor node in any cluster is attacked. Renewal across the network avoids computation required for local renewal at a single coordinator. Therefore, it is computationally optimal to calculate the key indices in this manner Now referring to FIG. 5, a flow chart 500 for implementing a network security framework for wireless aircraft communication in accordance with one or more embodiments of the invention is shown.

The process beings at block 502 which provides generating a key index sequence. The key index sequence is generated by the AID 102. The process continues to block 504 which provides distributing the key indices to a cluster coordinator (wireless data controller). It is to be understood that the key indices can be transmitted to a plurality of wireless data controllers.

Block 506 provides sending a beacon for association with one or more sensor nodes. The process continues to decision block 508 which determines whether the sensor node is associated with the data controller. If the sensor node is associated with the wireless data controller, block 510 provides sending the key indices to the sensor node during the contention access period (CAP).

Block 512 provides waiting for beacon. One or more sensor nodes are waiting to be associated with wireless data controller. Clusters are formed for wireless data controllers and the associated sensor nodes. In the event the sensor nodes have yet to be associated with the wireless data controller, the process continues to attempt to associate the sensor nodes at block 508.

At decision block 514, the process determines whether the encryption key life has expired. In the event the encryption key life has expired, the process continues to block 516 which renews key index subset for the wireless data controller and sends the renewed key index to the affected controller.

In the event the encryption key life has not expired, the process continues to decision block 518 which determines whether a node compromise indication has been received from the data controller. In the event that any node in the network has been compromised, block 520 provides renewing the entire key index sequence and redistributes the key index sequence to each wireless data controller. Otherwise, the process continues to move to the next transmission cycle as shown in block 522.

Figure 6:
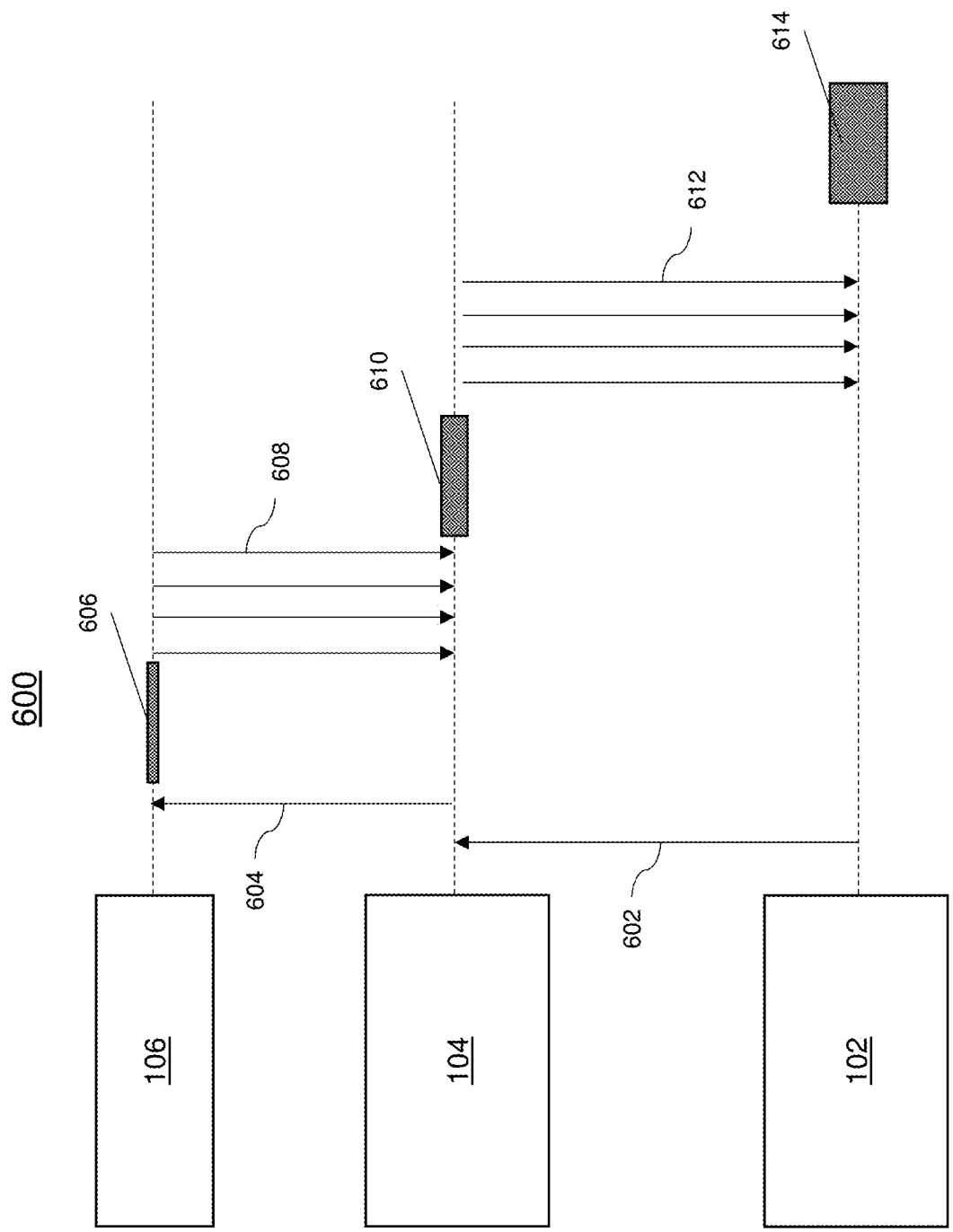
FIG. 6 depicts a timing diagram for implementing a network security framework for wireless aircraft communication in accordance with one or more embodiments of the invention.

Now referring to FIG. 6, a timing diagram 600 for implementing a network security framework for wireless aircraft communication in accordance with one or more embodiments of the invention is shown. In a non-limiting example, the timing diagram 600 is implemented in a WSN 100 (similar to that shown in FIG. 1).

In one or more embodiments of the invention, the security framework using beacon enabled TDMA protocol compatible devices such as IEEE 802.15.4. The key indices as allotted by the AID 102 (network manager) are transmitted to sensor nodes during a contention access period (CAP) of a beacon cycle by the wireless data controller (cluster coordinator). The indices are transmitted to the sensor nodes as a one-to-one dedicated communication between the wireless data controller and associated sensor nodes. The sensor nodes encrypt their respective message using a randomly generated key. The encrypted message is sent to the wireless data controller 104 during their allotted guaranteed time slots.

In one or more embodiments of the invention, the AID 102 transmits the key indices to one or more wireless data coordinators 104 in transmission 602. The wireless data controller 104 the sends a transmission 604 including the key indices received from the AID 102 to one or more sensor nodes 106 and end devices which use the key indices for data encryption when exchanging data.

Transmission 608 generates dynamic keys using the key indices for data being transmitted to the wireless data controller 104. In one or more embodiments of the invention, the wireless data controller 104 decrypts the data packet 606 received from the sensor nodes 106. The decrypted data packet 610 is the sent to the AID 102 in a transmission 612. The AID 102 is configured to aggregate the received decrypted data packets 610 where the aggregated data 614 is transmitted to other devices/systems for further processing and analysis.

Now referring to FIG. 7, a high-level flow chart 700 for implementing a network security framework for wireless aircraft communication in accordance with one or more embodiments of the invention is shown. Block 702 provides receiving a key index sequence over a first communication link. The first communication link can be a wired communication link between the AID 102 of FIG. 1 and the wireless data controllers 104. Block 704 provides transmitting a subset of the key index to one or more nodes. The key index that is received from the AID 102 is segmented and a portion or subset of keys is transmitted to each of the sensor nodes 106 to be used for encryption of data over the second wireless communication link. Block 706 includes generating a random encryption key based at least in part on the subset of the key index sequence. The random encryption keys are not stored in the system because they are dynamically generated for the transmission of each message over the wireless communication link. Block 708 provides encrypting data using the random encryption key, and Block 710 provides transmitting the encrypted data over a second communication. The second communication link is a wireless connection that exists between the wireless data controllers 104 and the sensor nodes 106.

The technical benefits includes to robust security framework that is capable of being implemented into a wireless communication network for safety-critical application such as wireless aircraft communication. The clustered architecture onboard the aircraft network facilitates deployment of scalable wireless sensor networks. In addition, the encryption algorithm is computationally efficient and optimizes storage because encryption keys are not being stored but are dynamically generated upon each data transmission. The encryption key management framework efficiently uses channel bandwidth and does not affect network QoS because the keys can be selectively updated and renewed by cluster.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for implementing a network security framework for wireless aircraft communication, comprising:
   receiving a key index sequence over a first communication link;
   storing a key index matrix;
   transmitting a subset of the key index to one or more nodes;
   generating a random encryption key based at least in part on the subset of the key index sequence;
   encrypting data using the random encryption key, wherein encrypting the data comprises one or more nodes configured to perform a global level key index renewal and a local level key index renewal, wherein the global level key index renewal comprises shifting the subset of the key index sequence to a neighboring node, wherein the local level key index renewal comprises a bitwise shift of each index in the subset of the key index sequence; and
   transmitting the encrypted data over a second communication link.

2. The method of claim 1, wherein the first communication link is a wired communication link.

3. The method of claim 1, wherein the second communication link is a wireless communication link.

4. The method of claim 1, further comprising: detecting an expiry of encryption keys; and
   responsive to the detection, renewing the encryption keys for a particular wireless data controller.

5. The method of claim 1, further comprising: detecting a tampering of sensor nodes; and
   responsive to the detection, transmitting new encryption key indices for each wireless data controller in a network.

6. The method of claim 1, further comprising updating the encryption keys and allocating the keys are based on a Fibonacci series.

7. A system for implementing a network security framework for wireless aircraft communication, comprising:
   a first node;
   one or more second nodes, wherein the first node is connected to the one or more second nodes over a first communication link, wherein the first node transmits a key index sequence to the one or more second nodes; and
   one or more third nodes, wherein the one or more second nodes are connected to the one or more third node over a second communication link, wherein the one or more second nodes transmits a subset of the key index sequence to the one or more third nodes to generate random encryption keys based at least in part on the subset of the key index sequence, wherein the one or more second nodes are configured to perform a global level key index renewal and a local level key index renewal, wherein the global level key index renewal comprises shifting the subset of the key index sequence to a neighboring second node, wherein the local level key index renewal comprises a bitwise shift of each index in the subset of the key index sequence.

8. The system of claim 7, wherein the key index is transmitted sequentially to the one or more second nodes.

9. The system of claim 7, wherein the first communication link is a wired connection.

10. The system of claim 7, wherein the second communication link is a wireless connection.

11. The system of claim 7, wherein the first node comprises a key index matrix for storing the key index sequence.

12. The system of claim 7, wherein the one or more second nodes and the one or more third nodes comprise encryption key generator modules for generating encryption keys from the key index sequence.

13. The system of claim 7, wherein the first node is an aircraft interface device comprising a key index renewal and revocation module to renew or revoke the key index sequence.

14. The system of claim 7, wherein the first node is a network manager to aggregate received data and communicates with external systems.

15. The system of claim 7, wherein the one or more second nodes are wireless data controllers.

16. The system of claim 7, wherein the one or more third nodes are sensor nodes.

17. A device for implementing a network security framework for wireless aircraft communication, comprising:
   a first interface configured to receive a first message from the aircraft interface device over a first communication link, wherein the first message includes a key index;
   a second interface configured to transmit a second message to one or more sensors, wherein the second message includes a subset of the key index;
   an encryption key generator module configured to generate an encryption key based on the second message and encrypt a message using the encryption key;
   a key index renewal and revocation module configured to perform a global level key index renewal and a local level key index renewal, wherein the global level key index renewal comprises shifting the subset of the key index to a neighboring node, wherein the local level key index renewal comprises a bitwise shift of each key index in the subset of the key index; and
   transmitting encrypted messages over a second communication link.

18. The device of claim 17, wherein the first interface is a wired interface and the second interface is a wireless interface.

19. The device of claim 17, wherein the first interface is configured to receive updated key indices based on detecting an expiry of an encryption key or tampering of any sensor node.

* * * * *